Figure 1:
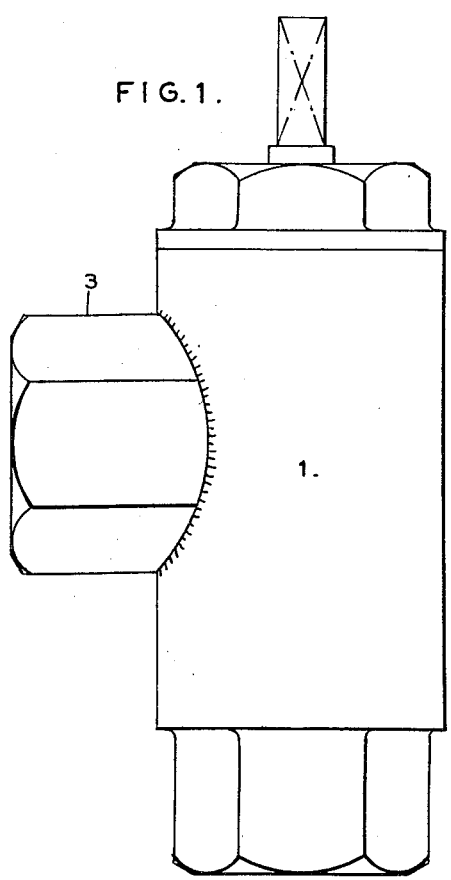

Sept. 11, 1962     O. H. VARGA     3,053,501
SEALING RINGS FOR VALVES

Filed Oct. 27, 1958     2 Sheets-Sheet 1

Sept. 11, 1962  O. H. VARGA  3,053,501
SEALING RINGS FOR VALVES

Filed Oct. 27, 1958  2 Sheets-Sheet 2

_United States Patent Office_

3,053,501
Patented Sept. 11, 1962

3,053,501
SEALING RINGS FOR VALVES
Otto Herman Varga, Bradford-on-Avon, England, assignor to Seetru Limited, Bristol, England, a body corporate of Great Britain
Filed Oct. 27, 1958, Ser. No. 769,932
Claims priority, application Great Britain Mar. 21, 1955
5 Claims. (Cl. 251—332)

This application is a continuation in part of Serial No. 572,658, now abandoned, and the invention relates to valves for controlling liquids or gases which are characterised by a plunger sitting on a valve seat. The valves in question may be relief valves or they may be stop or control valves adapted to be operated manually or by remote control or servo means.

The valves according to this invention employ a lipped D-ring of rubber or rubber like material seated in a groove in the plunger as the means for providing the ultimate seal between the pressure side and the down-stream side of the valve when this is closed.

The valve plunger may have a conical land on the downstream side of the lipped D-ring groove and this makes metal to metal contact with a conical valve seat when the valve is closed. This metal to metal contact may provide a measure of sealing but the ultimate sealing effect is provided by the hydrostatic or self-caulking action of the lipped D-ring which is forced by liquid pressure into the angle between a wall of the groove wall on the downstream side and the valve seat face, and there seals off effectively the fluid which would tend to leak past the valve plunger on its seat.

The self sealing action of so called hydrostatic rubber rings is well known and rubber O-rings have generally been used for this purpose in valves. However, rubber O-rings tend to lift out of their groove when the valve opens and subsequently frequently become completely dislodged from the valve plunger by the liquid pressure. It is the provision of a circumferentially continuous lip on the upstream side of a D section ring which makes possible the more effective use of free resilient sealing rings in valving applications, because the lip seals off the underside of the ring in the groove and prevents liquid under pressure from entering there.

In a taper seating valve with the pressure acting on the smaller end of the conical plunger the groove for the lipped D-ring is preferably formed rectangular with its walls at right angles to the conical land. The groove is made wide enough to accommodate the full width of the D-ring comfortably and the bottom of the groove is preferably parallel to the conical land of the valve seat and of the plunger. As a result of this, the groove diameter at its inner upstream corner is less than the groove diameter under the centre of the D-ring itself, and to provide an initial seal between the lip and the bottom of the groove on fitting, the lip is moulded with a fairly strong conical bias in its free state so that the free edge of the lip is stretched by say at least 5–10% when the ring is fitted into the groove.

To ensure the continuous sealing action of the lip against the bottom of the ring groove, it is usually necessary to vent the underside of the lip to the downstream side of the valve permanently, so that the pressure difference acting upon the lip should force this down permanently firmly against the bottom of the ring groove. This venting of the underside of the lip is preferably achieved by forming a narrow shallow groove in the bottom of the main groove itself, and drilling a series of holes through this shallow groove to a well formed in the plunger which is open to the down-stream side. This lip venting groove has a width of conveniently about ⅓ of the width of the lip and it is so placed in the main groove that it comes to lie approximately underneath the lip, when the ring is fitted.

The cone angle for the valve seat is preferably an included angle of 45° and the plunger land on the upstream side of the ring groove may also be formed conical, but it is not necessary for this to make metal to metal contact with the valve seat, and in some cases it is a definite advantage for this land to be well clear of the valve seat so as to admit fluid pressure to the ring itself.

The valve plunger, as described, may be machined from the solid, or alternatively, it may be built up from several components which are screwed or fastened together. The latter may be of advantage where lipped D-rings of comparatively tough plastic material are used, such as a polyamide (e.g. nylon), which may be less extensible than rubber and which it may be difficult to stretch over the end of the plunger for fitting into the groove. In such a case the plunger can be dismantled and the ring fitted into the groove without stretching and subsequently the plunger is assembled again to form the closing side of the ring groove with the ring contained therein. In such an arrangement the ring may also serve to seal off any joints in the plunger itself between the dismountable components.

The valve seat itself can either be machined solid in the body of the valve housing, or it may be formed in an insert pressed or otherwise secured and sealed in the valve housing.

Figure 2:
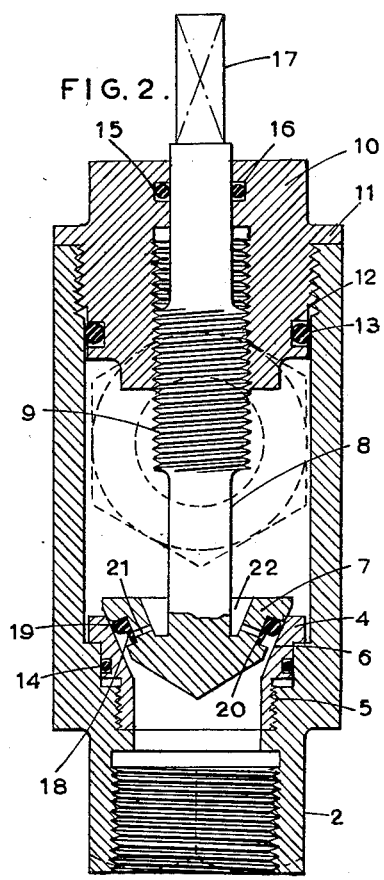
Figure 3:
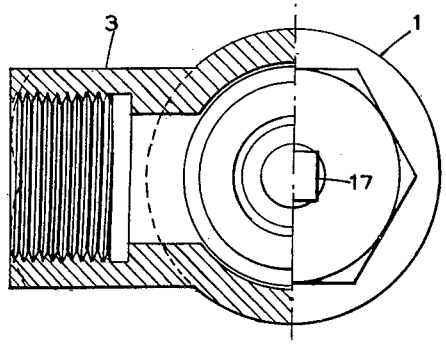

The invention will be further described with reference to the accompanying drawings where several embodiments are illustrated by way of example, and wherein FIGURES 1 to 3 are respectively a side elevation, vertical section and plan view partly in section of a screw operated conical valve having a removable seat.

Figure 4:
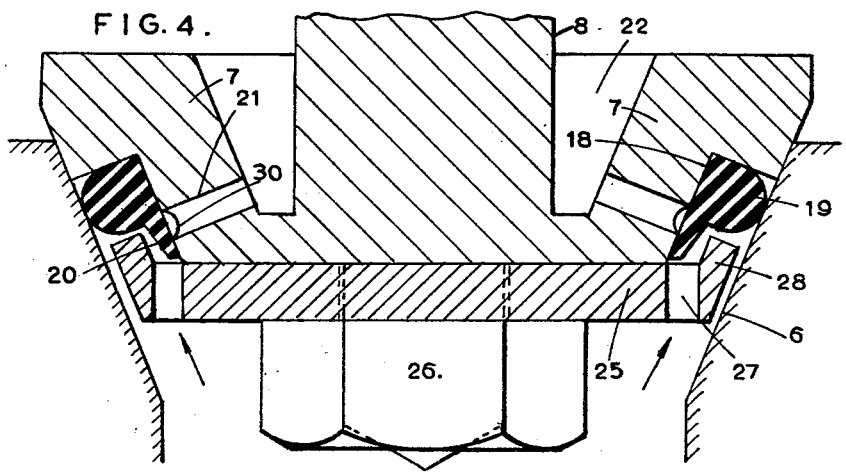

FIGURE 4 is a diagrammatic representation of a conical valve having a lipped D-ring set in a groove similar to the first embodiment but retained by a flanged ring component separate from but secured to the plunger.

In both these embodiments of valve, it is intended that the general direction of flow should be upward as indicated by the arrow.

Figure 5:
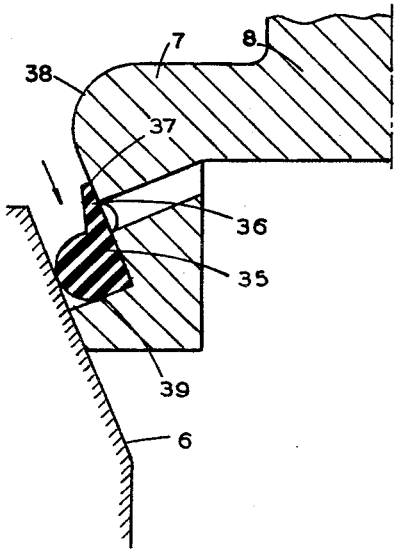
Figure 6:
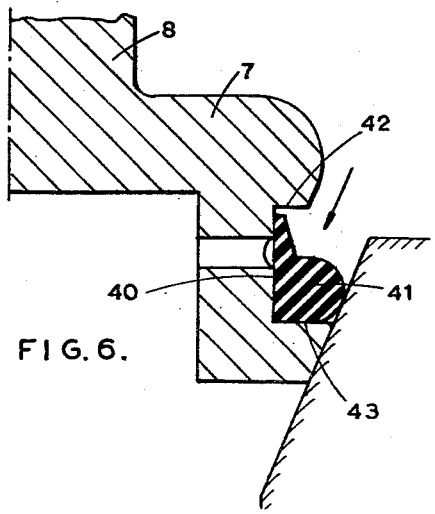

FIGURE 5 is a half sectional view of a conical valve suitable for use where the pressure is applied at the major diameters of the cone, i.e. the flow is generally downward, as indicated by the arrow, and FIGURE 6 is a similar view of a conical valve where the base of the ring containing groove is cylindrical.

Referring now to the drawings but first more particularly to FIGURES 1 to 3, the screw-operated conical valve illustrated has a cylindrical valve chamber 1 having an internally threaded inlet port 2 and a similarly internally threaded outlet port 3 arranged as unions for the appropriate pipe connections.

Between the valve chamber proper and the internally threaded portion of the inlet port 2 a removable valve seat 4 is located having an internally threaded portion 5 screwed into the threaded bore of the valve chamber.

The operative seating surface 6 of the removable seat 4 is of frusto conical form and co-operates with a frusto conical valve plug 7 at the lower end of a valve stem 8 which has a threaded portion 9 engaged in a removable cap or cover 10 for the valve chamber.

The cap or cover is flanged at 11 to engage the upper cylindrical end of the valve chamber 1 and has a peripheral groove 12 in which is located an O-ring 13 providing sealing engagement with the interior cylindrical wall of the valve chamber 1.

A similar O-ring 14 effects sealing engagement between the valve seat 4 and the chamber, while yet a third O-ring 15 located in a groove 16 in the cap 10 prevents leakage of fluid along the valve plunger 8 which has a square shank 17 projecting above the cap or cover to take a lever or key through the medium of which the valve is operated.

Seated in a peripheral groove 18 in the conical valve plug 7 is a lipped D-ring 19, the lip 20 whereof rests on the base of the groove 18. As will be seen in this embodiment the groove is wide enough to accommodate the full width of the D-ring 19 and the bottom of the groove is parallel to the frusto conical surface 6 of the seating.

The underside of the lip 20 is vented to the downstream side of the valve by a series of holes 21 which communicate with a well 22 formed for the purpose in the rear of the valve plug 7.

Advantageously, a shallow peripheral trough under the lip of the D-ring 19 is formed in the bottom of the groove 18 as is more clearly shown in FIGURES 4 to 6.

Referring now to FIGURE 4, 6 is again a frusto conical seating surface, 7 is the valve plug, 8 the valve stem. In this arrangement the lipped D-ring 19 is retained by a flanged ring component 25 removably secured at the foot of the valve stem by a nut 26.

27 are ports through the ring 25 inside its flange 28 which is shown overlying the lip 20 of the ring 19, which ports give the fluid direct access to the outer surface of the lip.

30 represents a shallow trough in the base of the ring groove 18 opening communication between the lip venting ports 21 and enabling them to vent the whole inner periphery of the lip.

In the arrangements shown in FIGURES 1 to 4 the direction of liquid flow through the valve is upwards, e.g. from the inlet port 2 to the outlet port 3 in the first embodiment, and FIGURES 5 and 6 illustrate typical arrangements where the flow of liquid is downward past the major diameter of the conical plug towards its minor diameter.

Referring now to FIGURE 5, a lipped D-ring 35 having a lip 36 is stretched to be fitted on to the frusto conical peripheral surface 37 of a valve plug 38 which is formed with a shoulder 39 locating the D-ring.

In the alternative arrangement shown in FIGURE 6 the valve plug is formed with a groove having a cylindrical base 40 for a lipped D-ring 41, the groove having walls 42 and 43 at right angles to its base.

What I claim is:
1. A valve for controlling fluid under pressure including a plunger having a peripheral groove formed therein and having a conical portion cooperating with a complementary conical seat, said groove defining a surface of revolution on the plunger and having an upstream portion and a downstream portion and presenting at the downstream portion thereof an abutment wall portion on the plunger, a resilient ring received in said groove, said ring having a main body portion of generally D-shaped cross-sectional configuration, said ring including a continuous lip projecting from one side of the base of said main body portion and forming a smooth continuous under surface with said main body portion, the opposite side of said main body portion engaging said abutment wall portion of the plunger, the main body portion substantially filling the downstream portion of the groove, the lip extending toward the upstream portion of the plunger, the D-shaped main body portion of the ring effecting a seal between said surface of revolution and the conical seat when the valve is closed, said plunger including venting means formed therein in communication with said surface of revolution at a point upstream of the center of the base of the ring and approximately under said lip.

2. A valve for controlling fluid under pressure according to claim 1, wherein said surface of revolution of the groove is frusto conical of substantially the same cone angle as the seat.

3. A valve for controlling the fluid under pressure according to claim 1, wherein the sealing ring is retained by a plate separate from and secured to the plunger and forming another wall of the groove.

4. A valve for controlling fluid under pressure according to claim 1, wherein said groove presents another wall adapted to engage the ring to lift it from the conical seat during opening of the valve.

5. A valve for controlling fluid under pressure according to claim 1, wherein said surface of revolution of the groove is substantially cylindrical.

References Cited in the file of this patent
UNITED STATES PATENTS

| | | |
|---|---|---|
| 2,417,494 | Hoof | Mar. 18, 1947 |
| 2,487,659 | Lockheed | Nov. 8, 1949 |
| 2,542,390 | Brown | Feb. 20, 1951 |
| 2,620,206 | Cornelius | Dec. 2, 1952 |
| 2,713,989 | Bryant | July 26, 1955 |
| 2,827,922 | Guinard | Mar. 25, 1958 |
| 2,845,945 | Mancusi | Aug. 5, 1958 |

FOREIGN PATENTS

| | | |
|---|---|---|
| 811,696 | Germany | of 1951 |